United States Patent
Kantschar et al.

(10) Patent No.: US 7,051,712 B2
(45) Date of Patent: May 30, 2006

(54) METHOD FOR COMPUTING AN IGNITION ANGLE OF AN INTERNAL COMBUSTION ENGINE

(75) Inventors: Anton Kantschar, Eberdingen (DE); Robert Sloboda, Muehlhausen (DE); Rudi Eichhorn, Stuttgart (DE); Andreas Meinken, Leonberg (DE); Jochen Goebels, Ludwigsburg (DE); Jan Boettger, Lunzenau (DE); Goetz Stelzenmueller, Stuttgart (DE); Kai Dierssen, Karlsruhe (DE); Frederic Gabel, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/999,766

(22) Filed: Nov. 29, 2004

(65) Prior Publication Data

US 2005/0143900 A1    Jun. 30, 2005

(30) Foreign Application Priority Data

Dec. 20, 2003 (DE) ............................... 103 60 201

(51) Int. Cl.
F02P 5/00 (2006.01)

(52) U.S. Cl. ............................ 123/406.29; 123/406.35

(58) Field of Classification Search ........... 123/406.21, 123/406.29, 406.35, 406.39
See application file for complete search history.

(56) References Cited

U.S. PATENT DOCUMENTS

| 4,825,832 | A | * | 5/1989 | Satoh et al. ........... 123/406.21 |
| 5,645,034 | A | * | 7/1997 | Entenmann et al. ... 123/406.33 |
| 6,062,199 | A | * | 5/2000 | Entenmann et al. ... 123/406.21 |
| 6,145,491 | A | * | 11/2000 | Wilstermann et al. . 123/406.35 |
| 6,161,523 | A | * | 12/2000 | Unland et al. ......... 123/406.23 |
| 6,247,448 | B1 | * | 6/2001 | Scholl et al. .......... 123/406.33 |
| 6,574,954 | B1 | * | 6/2003 | Wakui et al. .................. 60/285 |
| 6,910,461 | B1 | * | 6/2005 | Tanei et al. ............ 123/406.29 |

* cited by examiner

*Primary Examiner*—Mahmoud Gimie
(74) *Attorney, Agent, or Firm*—Kenyon & Kenyon LLP

(57) ABSTRACT

A method for computing an ignition angle of an internal combustion engine as a function of the operating conditions of the engine and knock signals K, which indicate knocking combustion in the engine. If knock occurs, the ignition angle is retarded. If knock stops for a first period, the ignition angle is advanced again. Advance of the ignition angle is limited on the basis of the first period. If knock stops for a second period, which exceeds the first period, the ignition angle is further advanced.

11 Claims, 3 Drawing Sheets

METHOD FOR COMPUTING AN IGNITION ANGLE OF AN INTERNAL COMBUSTION ENGINE

BACKGROUND INFORMATION

Methods for computing ignition angles in which knock signals indicating knocking combustion are taken into account are known. Typically, the ignition angle is immediately retarded when knocking combustion occurs. If knock then stops for a certain time, the ignition angle is gradually advanced again.

SUMMARY OF THE INVENTION

The method according to the present invention for computing an ignition angle of an internal combustion engine has the advantage over the related art that it provides improved knock control. The ignition angle is no longer advanced rigidly, but flexibly. The internal combustion engine may thus be operated closer to the knock limit with a reduced number of knock events. The load on the engine due to knock is thus reduced, while fuel utilization is improved.

The periods may be defined for computation purposes as time periods or as number of combustion processes. Rotational speed and load are preferably used as operating conditions. The computation of the ignition angle may be simplified if a distinction is made between a base ignition angle and a knock control ignition angle. The faster procedures are associated in a particularly simple manner with the knock control ignition angle, and the slower control procedures with the basic ignition angle. The method according to the present invention may also be used for multicylinder engines.

DETAILED DESCRIPTION

Figure 1:
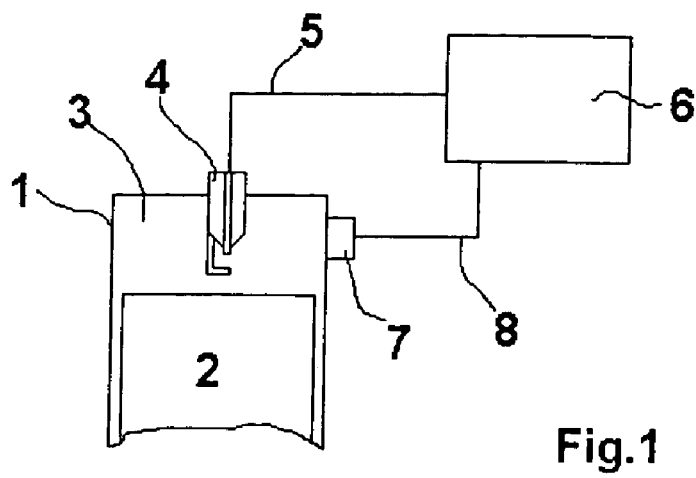
FIG. 1 shows a schematic representation of an internal combustion engine.

FIG. 1 schematically shows an internal combustion engine having knock control and the corresponding controller. A cylinder 1 and a piston 2 define a combustion chamber 3 into which a spark plug 4 protrudes. A combustible gasoline-air mixture is introduced into combustion chamber 3 by valves (not shown) such as air valves and injectors and ignited by spark plug 4 via an ignition spark. The resulting increase in pressure in combustion chamber 3 moves piston 2, and this movement is converted by a connecting rod (not shown here) into a movement of a crankshaft of the engine. This is a typical gasoline engine.

Combustion in combustion chamber 3 may occur with pronounced pressure peaks under certain operating conditions such as very hot engine and fuel having low antiknock properties; such pressure peaks result in excessive local temperature increases or excessive local pressures in combustion chamber 3. This type of combustion is known as knock and must be avoided because it may permanently damage the engine. On the other hand, it is advantageous to operate the engine as close as possible to the knock limit, where fuel energy utilization is best. The ignition angle is an important parameter for operating the engine close to the knock limit. Ignition typically takes place near the top dead center of the movement of piston 2 in cylinder 1. The earlier ignition takes place before the TDC, the better the fuel energy utilization is, but at the same time the tendency of the engine to knock increases. If the ignition angle is retarded, combustion efficiency is reduced, while the tendency to knock diminishes. Knock control is used to achieve the optimum ignition angle, i.e., the best compromise between the tendency to knock and combustion efficiency. This knock control has a knock sensor 7, which is mounted outside of cylinder 1 or at another suitable location on the engine block. Knock sensor 7 transmits a signal, via a line 8, to a control unit 6 which controls the engine. Control unit 6 transmits corresponding ignition signals to spark plugs 4 via a line 5. The other devices for generating such ignition signals such as ignition coils, output stages, and the like are not shown here for the sake of simplicity.

Figure 2:
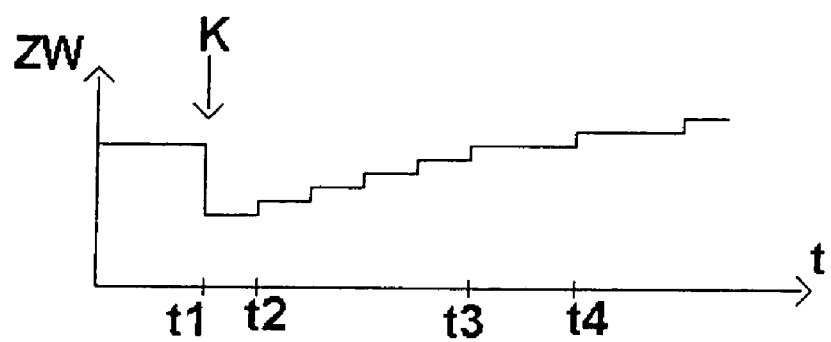
FIGS. 2, 3, and 4 elucidate the method according to the present invention for advancing the ignition angle.

FIG. 2 uses a time diagram to show how the ignition angle is adjusted by control unit 6 as a function of knocking and further parameters, time parameters in particular. In FIG. 2 ignition angle ZW is plotted against time t in a diagram. The further up the ignition angle is, the more advanced it is. A time axis t is plotted here. For internal computations, control unit 6 uses either time t or the number of processes, which converts directly into time if the rotational speed is constant.

At a time t1, a knock signal K is generated, i.e., control unit 6 analyzes the signals of knock sensor 7 to determine that knocking combustion is occurring in the combustion chamber. As a response to this knock, control unit 6 retards ignition angle ZW in a single large adjustment step. Ignition angle ZW thus adjusted is then maintained for a certain time period. At time t2, the ignition angle is advanced by control unit 6, this advancement step at time t2 being considerably smaller than the retarding step at time t1. If knock stops, the ignition angle is advanced further, always with a wait period such as the one between times t1 and t2 before the ignition angle is advanced again. At time t3 the ignition angle has reached its original level again as was the case before knock event K. After time t2, the ignition angle remains unchanged for a somewhat longer period and is not advanced again until time t4. The time period between times t3 and t4 is considerably longer than the time period between times t1 and t2. After time t4, the ignition angle is advanced again, the individual adjustment steps depending on knock-free operation during the period t3–t4.

Improved knock control is achieved using the procedure illustrated in FIG. 2. When knock K occurs, the ignition angle is quickly retarded as normally provided to protect the engine and reduce the cylinder temperature. When, after retarding, no knock occurs for a predefined time period, period t1–t2 in this case, the ignition angle is advanced again in the direction of optimum fuel consumption and performance. The ignition angle is then advanced again as a function of period t1–t2 or a corresponding number of processes. The ignition angle is advanced as a function of this first time period t1–t2 if no knock event has occurred during this period t1–t2. After each adjustment, the ignition angle is advanced again after a waiting period corresponding to period t1–t2 provided that no knock occurs during this period.

However, this adjustment mechanism is limited, since otherwise the ignition angle would be set back relatively rapidly into a range susceptible to knock, and knock would occur again. According to the present invention, if the ignition angle is no longer adjusted on the basis of the first time period t1–t2, the ignition angle is advanced once more, however, for a considerably longer period, here t3–t4. The ignition angle is thus brought back into a range susceptible to knock initially for a first period t1–t2, which limits the adjustment thus made possible. If this adjustment is then no longer possible, the ignition angle is advanced again, but for a considerably longer period t3–t4. Instead of the corresponding time periods, each adjustment may also be performed after a corresponding number of combustion processes.

FIG. 2 shows the operating state of steady-state operation, i.e., the operation of the engine under different operating conditions is not discussed here for the sake of simplicity. However, different operating states of the engine are used in actual operation. For example, the engine speed and load vary relatively frequently in actual operation. Of course, the ignition angle must be adjusted accordingly as a function of these operating states. This is normally accomplished together with knock control in that a basic ignition angle $ZW_{basic}$ is provided, which depends on the load and speed, and a knock control ignition angle is added to the basic ignition angle. Basic ignition angle $ZW_{basic}$ is established such that knock-free operation of the engine is achieved in every case at this ignition angle. A knock control (ignition) angle ZWKR, which causes the ignition angle to be advanced, is added to this basic ignition angle $ZW_{basic}$. Knock control ignition angle ZWKR thus only allows the ignition angle to be advanced, i.e., adjusted in the direction of combustion that is more susceptible to knock. The maximum value for knock (control) ignition angle ZWKR is therefore 0, which then does not correspond to an advance beyond basic ignition angle $ZW_{basic}$. Knock (control) ignition angle ZWKR is regulated in the sense that, when knock occurs, the knock ignition angle is reduced, causing the ignition angle to be retarded. The ignition angle is advanced again as a function of a first period (either time period or number of processes) during which no knocking combustion occurs, until knock ignition angle ZWKR reaches zero again.

The present invention provides additional regulation for basic ignition angle $ZW_{basic}$, which, however, uses a considerably longer second period (time period or number of processes) to further advance the ignition angle. The second period is considerably longer than the first period, because the basic ignition angle should only be adjusted when it is ensured, on the basis of the response, that further advance is desirable. The basic ignition angle is also a function of the rotational speed and/or the load.

The quality of knock control is improved by this procedure. Knock control ignition angle ZWKR may then be regulated in smaller increments.

By advancing the basic ignition angle for the second time for a considerably longer period, the ignition angle is carefully brought back into a range susceptible to knock. Compared to an adjustment of the ignition angle for a shorter first period into the range susceptible to knock, this has the advantage that the number of knock events occurring in the engine is reduced.

Figure 3:
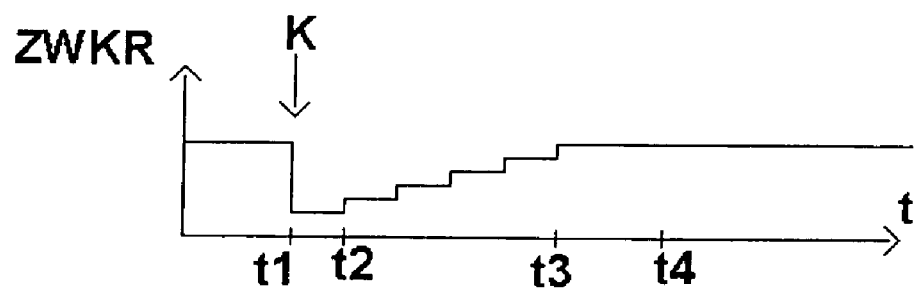
Figure 4:
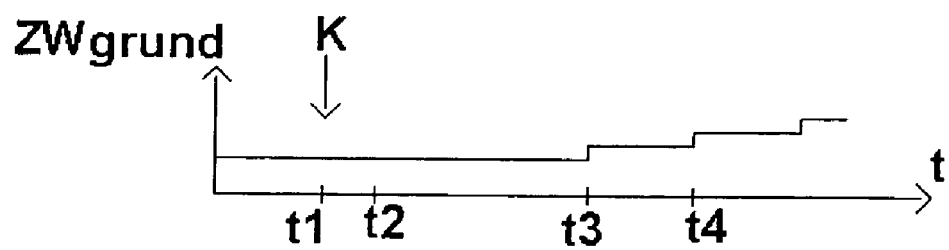

FIGS. 3 and 4 separately show knock control ignition angle ZWKR and basic ignition angle $ZW_{basic}$, which added together form the ignition angle according to FIG. 2. FIG. 3 shows ZWKR. As becomes evident, the corresponding curve of the ignition angle in FIG. 2 up to time t3 depends on the variation of ZWKR. Starting at time t3, the knock control ignition angle no longer changes, because it has reached zero (maximum advance). Starting at this point in time, the variations of the ignition angle in FIG. 2 are due to the change in basic ignition angle $ZW_{basic}$ as shown in FIG. 4. It shows that, starting at time t3, the ignition angle is advanced further due to the changes in the basic ignition angle.

Figure 5:
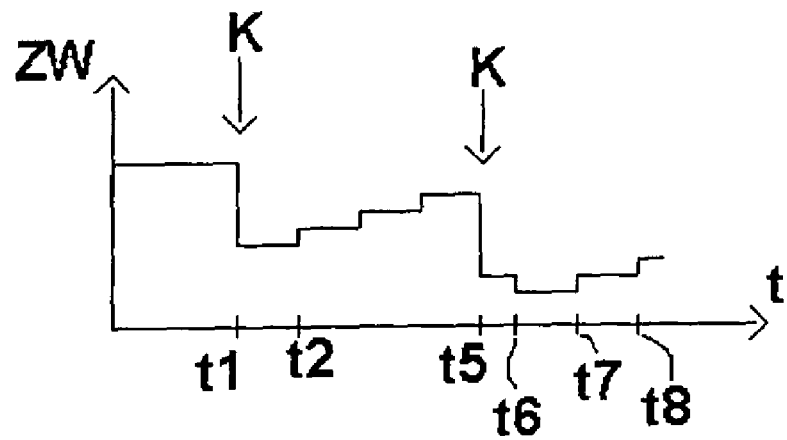
FIGS. 5, 6, and 7 elucidate the method according to the present invention for retarding the ignition angle.

FIG. 5 shows the regulation procedure in which the ignition angle is retarded, again on the basis of an ignition angle plotted against time or the number of processes. Up to time t2, FIG. 5 corresponds to the curve in FIG. 2. After time t2, the ignition angle is advanced again, as was also described previously in FIG. 2. However, in this case the ignition angle is not advanced to the value that was used before knock event K at time t1, but a knock event K occurs again at time t5. As a response to this knock event, the ignition angle is immediately retarded again. After a short time period, however, at time t6, the ignition angle is retarded again. The ignition angle is retarded at times t1 and t5 as a function of the knock signal. Whenever knock occurs, the ignition angle is retarded by a distinct step. At time t6, the ignition angle is retarded on the basis of another control strategy. The ignition angle is considered constant over a longer time period. If the average value of the ignition angle is low over a longer time period, which includes the range between t1 and t6, for example, the ignition angle is retarded. This measure limits the final value of the new advance, since this advance is only possible up to a certain value. The decision to retard the ignition angle at time t6 again, regardless of a knock event, results from the analysis of the past behavior of the ignition angle over a longer period, which includes the period from time t6 to approximately time t1.

The ignition angle is retarded at time t6 regardless of knocking whenever the ignition angle remains below a comparative value for a long period of time or a large number of processes. This may take place, for example, by averaging, i.e., an average of the ignition angle is formed over a certain period of time or number of combustion events. When this average value of the ignition angle is less than a predefined value, the ignition angle is retarded regardless of any current knock event. Alternatively, it may also be considered whether a certain number of knock events has taken place during this period. If this procedure is used, the ignition angle is retarded more, i.e., retards at times t5 and t6 are performed simultaneously. The most advanced ignition angle that is achievable using this relatively quick advance is limited because of the limited advance on the basis of the first time period, i.e., in interval t1–t2. Additional advance may be achieved only via slower advance via the second longer period t3–t4. After time t6, the ignition angle is adjusted again as described in FIG. 2, i.e., the ignition angle is advanced at times t7 and t8.

The procedure depicted in FIG. 5 is particularly simple to implement if the ignition angle is determined again by addition of a basic ignition angle and a knock control ignition angle. The ignition angle is retarded at time t6 by influencing the basic ignition angle, i.e., the basic ignition angle is retarded. The knock control ignition angle, which causes the ignition angle to be advanced, is limited to a maximum advance, whereby the ignition angle may only be advanced up to a certain point for reasons of engine durability.

Figure 6:
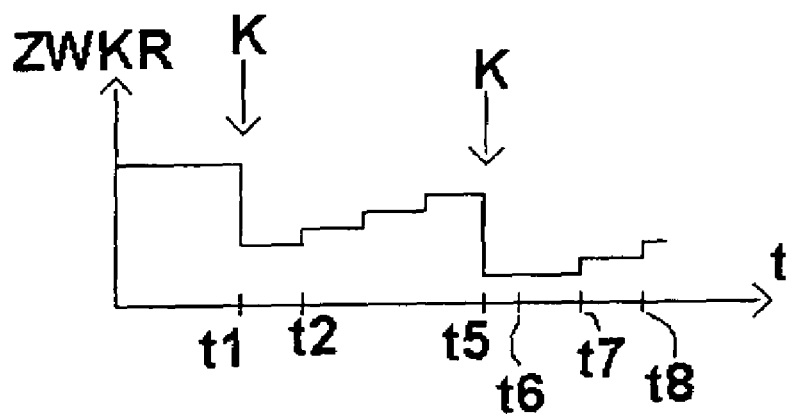
Figure 7:
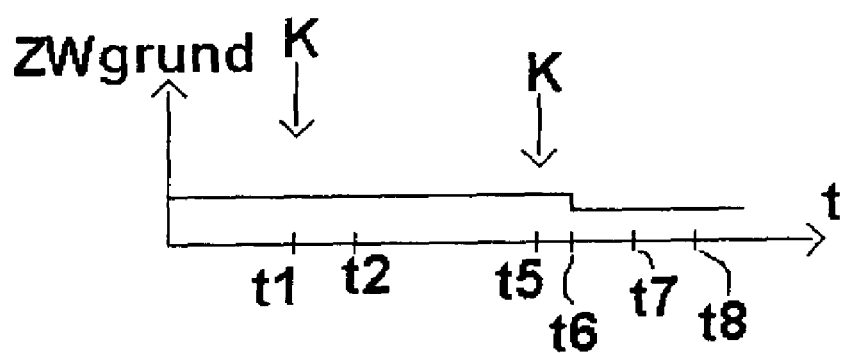

The curve of knock control ignition angle ZWKR over time is represented in FIG. 6, and the curve of basic ignition angle $ZW_{basic}$ is represented in FIG. 7. To be noted here is the interval between times t6 and t7, during which the curve of ZWKR differs from that of the ignition angle. In this range, the ignition angle may be additionally retarded by modifying $ZW_{basic}$ and not ZWKR, at time t6.

Figure 8:
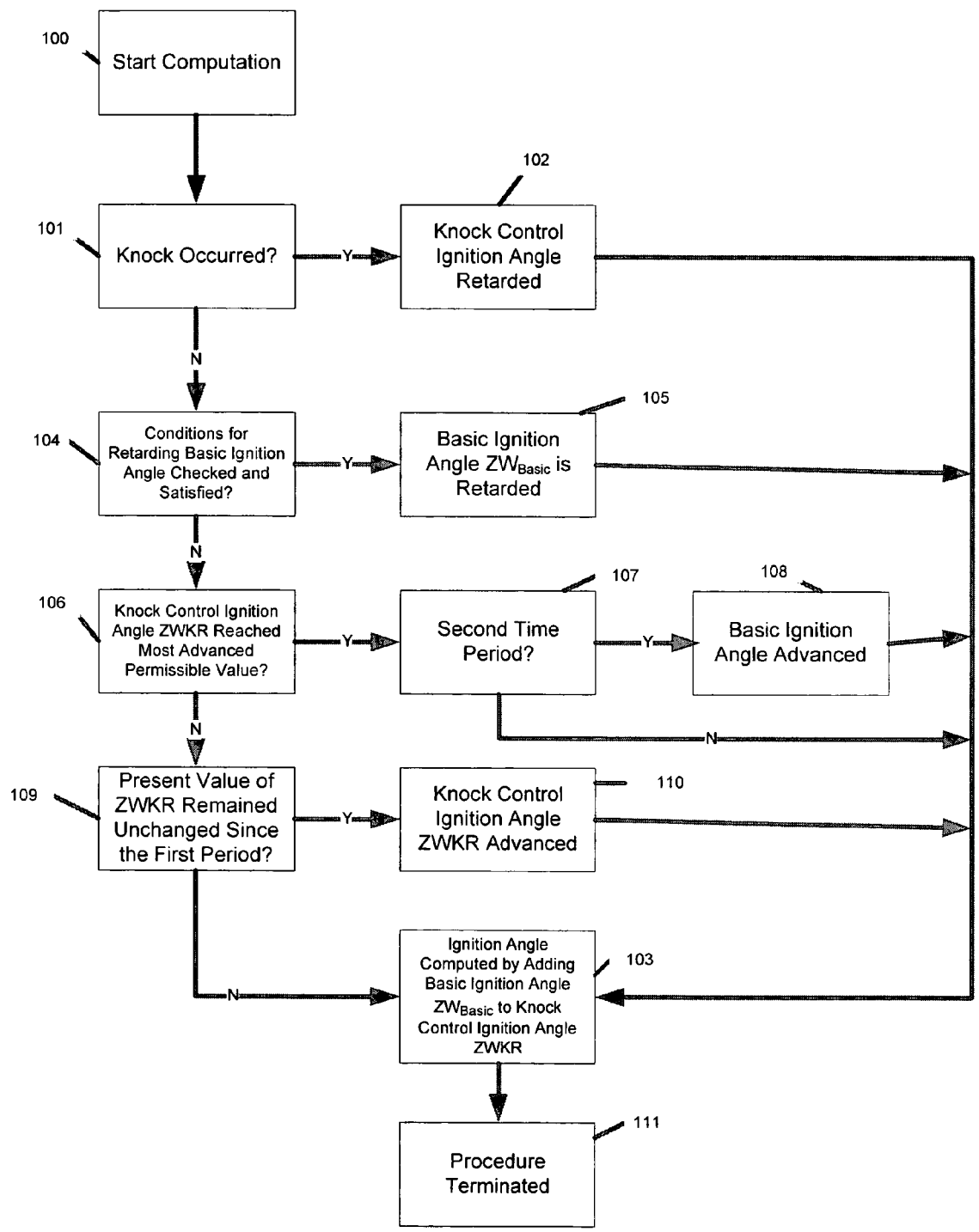
FIG. 8 shows a program sequence for the computation method according to the present invention.

FIG. 8 uses a schematic program sequence to show the computation of the ignition angle. The computation starts in block 100. Block 100 is followed by query block 101, in which a check is performed to determine whether knock has occurred. If knock has occurred, block 101 is followed by block 102, in which the knock control ignition angle is retarded. Block 102 is followed by block 103, which is elucidated later. If no knock has occurred, block 101 is followed by block 104, in which the conditions for retarding the basic ignition angle are checked. As an example, it is checked in block 104 whether the average value of knock control ignition angle ZWKR is excessively retarded over a third time period. This third period includes a relatively long time period or a relatively large number of processes. If this is the case, step 104 is followed by step 105, in which basic ignition angle $ZW_{basic}$ is retarded. Step 105 is followed by step 103 again. If step 104 did not determine that the average value of ZWKR is excessively retarded, step 104 is followed by step 106. In step 106 a check is performed to determine whether knock control ignition angle ZWKR has reached its most advanced permissible value. If this is the case, step 106 is followed by step 107. In step 107 a check is performed to determine whether this is a second time period. If this is the case, step 107 is followed by step 108, in which the basic ignition angle is advanced. Step 108 is followed by step 103 again. If step 107 has determined that ZWKR does not yet have its maximum value for the second time period, then step 107 is followed by step 103. If step 106 determines that knock control ignition angle ZWKR has not yet reached its maximum value, step 106 is followed by step 109, in which a check is performed to determine whether the present value of ZWKR has remained unchanged since the first period. If this is not the case, step 109 is followed by step 103. If this is the case, step 109 is followed by step 110, in which knock control ignition angle ZWKR is advanced. The advance is limited to a maximum value. Step 110 is followed by step 103. In step 103 the ignition angle is computed by adding basic ignition angle $ZW_{basic}$ to knock control ignition angle ZWKR. Step 103 is followed by step 111, in which the procedure is terminated. It should be noted that the first period is shorter than the second period, which is in turn shorter than the third period.

The above-described method, in which a distinction is made between a basic ignition angle and a knock control ignition angle, has the advantage that computations may take place in a particularly simple and clearly structured manner. As explained previously, the basic ignition angle is also a function of the rotational speed and/or the load, so that the different operating conditions of the engine are taken into account. This may be accomplished, for example, by determining a first portion of the basic ignition angle from a characteristics map, which is a function of the rotational speed and/or the load. A second portion is then added to this first portion, which is no longer a function of the rotational speed or the load, and which has been determined by the method of FIG. 8. This procedure permits computation which is further simplified.

What is claimed is:

1. A method for computing an ignition angle of an internal combustion engine as a function of operating conditions of the engine and knock signals, which indicate knocking combustion in the engine, the method comprising:
    retarding the ignition angle if knock occurs; and
    advancing the ignition angle in the absence of knock for a first period, wherein the advance of the ignition angle is limited on the basis of the first period, and if the ignition angle is no longer adjusted on the basis of the first time period, and in the absence of knock for a second period, which exceeds the first period, the ignition angle is advanced.

2. The method according to claim 1, wherein the first and second periods are defined as time periods.

3. The method according to claim 1, wherein the first and second periods are defined as number of combustion processes of the engine.

4. The method according to claim 1, wherein the operating conditions include a rotational speed of the engine.

5. The method according to claim 1, wherein the operating conditions include a load of the engine.

6. The method according to claim 1, further comprising, to compute the ignition angle, computing and adding together a basic ignition angle and a knock control ignition angle, the knock control ignition angle being retarded if knock occurs, and advanced if knock does not occur for the first period.

7. The method according to claim 6, further comprising advancing the basic ignition angle if no knock occurs for the second period.

8. The method according to claim 6, further comprising retarding the basic ignition angle if the knock control ignition angle is retarded beyond a comparison value for a third period.

9. The method according to claim 8, further comprising using averaging to determine that the knock control ignition angle has been retarded excessively.

10. The method according to claim 1, wherein the engine is a multicylinder engine, and the ignition angle is computed individually for each cylinder.

11. The method according to claim 1, wherein the engine has a plurality of cylinders, and further comprising:
    computing a knock control ignition angle individually for each of the cylinders; and
    one of advancing and retarding basic ignition angles of all of the cylinders jointly.

* * * * *